W. HERTEL.
FRAME FOR MOTOR CAR CURTAINS.
APPLICATION FILED DEC. 13, 1920.
1,417,994.
Patented May 30, 1922.
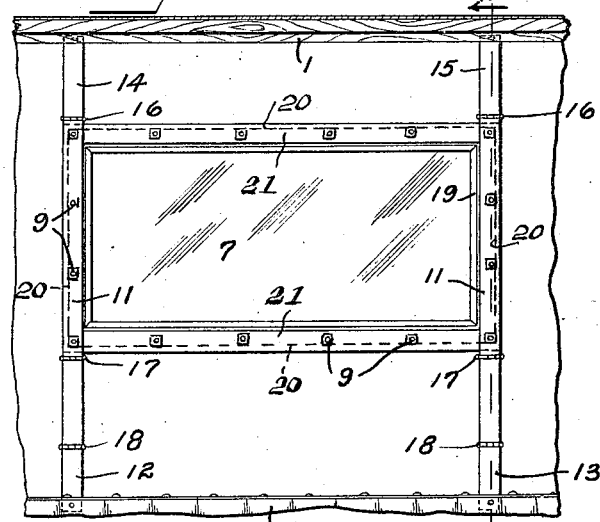
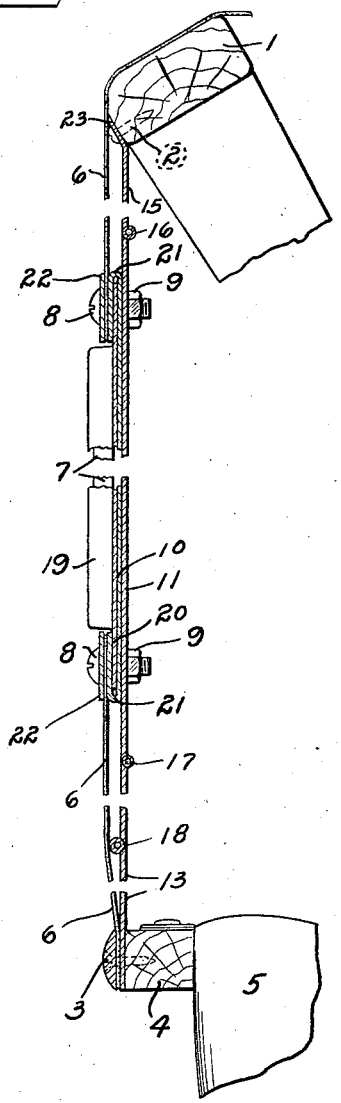
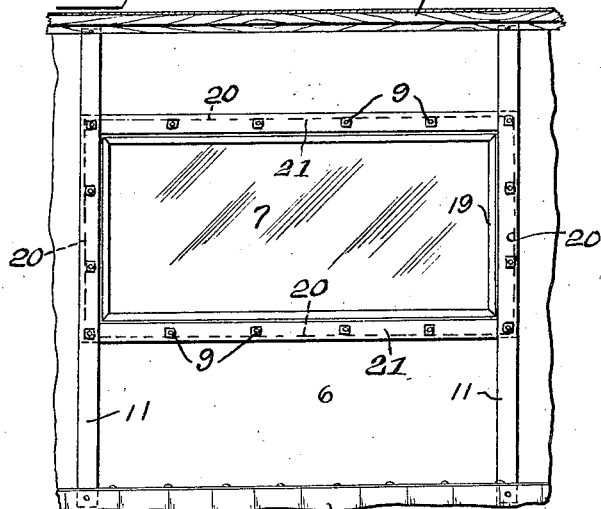
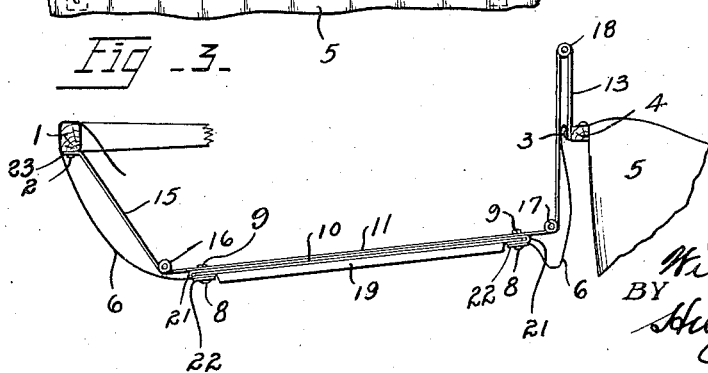
INVENTOR:
William Hertel,
BY
Hugh H. Wagner
ATTORNEY

UNITED STATES PATENT OFFICE.

WILLIAM HERTEL, OF ST. LOUIS, MISSOURI.

FRAME FOR MOTOR-CAR CURTAINS.

1,417,994.　　　　Specification of Letters Patent.　　Patented May 30, 1922.

Application filed December 13, 1920. Serial No. 430,234.

*To all whom it may concern:*

Be it known that I, WILLIAM HERTEL, a citizen of the United States, residing at the city of St. Louis, in the State of Missouri, have invented certain new and useful Improvements in Frames for Motor-Car Curtains, of which the following is a specification.

This invention is a collapsible automobile curtain with glass instead of mica, isinglass, celluloid, or the like for its windows. Notwithstanding the fact that glass is more frangible than the other substances named above, it is really more satisfactory as the transparent material for the windows of motor-vehicles because it is clearer and more transparent and more easily cleaned and because such other materials are very brittle, crack easily and thereafter look unsightly, and are very susceptible to becoming blurred by the rubbing incident to being collapsed or stowed away or cleaned. Another objection to them is that they are highly inflammable.

In the present invention collapsibility is provided, with especial attention to the frangibility of glass.

In the accompanying drawings forming part of this specification, in which like numbers of reference denote like parts wherever they occur, Figure 1 is a view of the curtain from the inner side, Figure 2 is a sectional view taken on the line 2—2 in Figure 1 looking in the direction indicated by the arrows;

Figure 3 shows the vehicle top and the rear curtain collapsed; and

Figure 4 is an inside view of the rear curtain, showing a modified form of my invention adapted for use without the hinges.

This curtain is illustrated as the rear curtain of an ordinary motor-vehicle, but it may be used elsewhere.

The bow 1 of an automobile top may be of any ordinary or desired construction. This device is attached thereto by screws 2 and, also, by screws 3 to a projection or projections 4 to the back 5 of the car.

Ordinary curtain 6 is borne in the usual manner by bow 1 and attached by screws 3 to projection 4. Its edges adjacent to the glass 7 are fastened by bolts 8 and nuts 9 to the frame 10 inclosing and holding the glass 7 and, also, to the main frame 11 of this device.

The brackets 12 and 13 remain stationary relative to the parts to which they are attached—i. e., they are fixed to projection 4, which is immovable relative to seatback 5.

Brackets 14 and 15 are fixed to the bow or rib 1, but as the rib 1 moves from the position indicated in Figure 2 to that shown in Figure 3, brackets 14 and 15 assume the position shown in Figure 3 when the top is collapsed. Brackets 14 and 15 being fixed rather than hinged or pivoted to rib 1 holds glass 7 more steadily, especially when the rib 1 is in motion up or down.

Hinges 16, 17, and 18 permit the collapsing of the vehicle top in the manner shown in Figure 3.

The glass 7 is held in frame 19, which overlaps the edges of glass 7 and it attached to support 20, which rests in pockets 21, formed by the U-shaped bending of frame 10 at its top and bottom. In Figs. 1 and 4, the side members of frame 10 are concealed behind frames 11 and are, therefore, not visible.

Bolts 8 pass through washer 22, curtain 6, the above-mentioned U-shaped bends of frame 10, support 20, and frame 11, and with nuts 9 unite all well together. Support 20 is, however, made of pliable and yielding material, and for that reason and the further fact that glass 7 rests loosely in frame 19 shocks and jars received by the wood and metal parts of the car are not imparted to the glass 7. This saves the glass 7 from breakage and is of a great advantage and enlarges the opportunities for the use of glass for such purposes in lieu of the objectionable materials named at the beginning of this specification.

Brackets 14 and 15 terminate at their tops in bent parts 23 for the ease of attachment to bow or rib 1.

Having thus described this invention, I hereby reserve the benefit of all changes in form, arrangement, order, or use of parts, as it is evident that many minor changes may be made therein without departing from the spirit of this invention or the scope of the following claims.

I claim:

1. A collapsible top for motor cars, comprising sectional supporting frame members, a supplementary frame member carried by the sectional supporting members, an inherently resilient retaining member carried by the supplementary supporting member for receiving a glass pane, and means extending through the fabric of the top, the supplementary frame member and resilient retaining member, and through the sectional supporting frame for holding the specified members in assembly.

2. A collapsible top for motor cars comprising supporting frame members including hingedly connected sections, a unitary supplementary frame member carried by certain of the sections for the supporting frame members, certain opposed edges of the supplementary frame member being bent upon themselves to form pockets, an inherently resilient retaining member carried in the pockets of the supplementary supporting member for receiving a glass pane, and bolts, each extending through the fabric of the top and the frames for holding said members in assembly.

3. A top for motor cars including supporting frame members, a unitary supplementary frame member attached to the supporting frame members, an inherently resilient retaining member positively engaged by the supplementary frame member for receiving a glass pane, and means extending through the fabric of the top and through the frames for holding said members in assembly.

4. In a top for motor cars including a supporting frame comprising hinged sections, a unitary supplementary frame member attached to certain of the sections of the top frames, the exterior edges of the upper and lower cross pieces of the supplementary frame member bent over toward each other to form pockets, an inherently resilient mounting receivable in the pockets, and a transparent pane carried by the mounting for the purpose set forth.

5. In an automobile top including bows and a fabric covering, supporting frame members for holding the bows in position, a unitary supplementary frame member carried by the supporting members, an inherently resilient receiving member for retaining a glass pane attached to the supplementary frame, and the frabric of the top engaged upon the supplementary frame whereby to provide a substantially weather proof window for the automobile top.

6. In a structure of the character described, the combination of a fixed member (like a motor-vehicle body), a movable member (like a stay or rib in a motor-vehicle top), a pane of glass interposed between the said two members; a plurality of brackets fixed to each of the said members, a frame for the glass, connecting members between the said frame and the said brackets, and a frame adapted loosely to support the said glass, the said frame comprising an edge-overlapping member, a support for the last-mentioned member, and means for supporting the said support, the said last-mentioned supporting means consisting of a U-shaped pocket, an adjacent frame, and a plurality of bolts or the like.

In testimony whereof I hereunto affix my signature.

WILLIAM HERTEL.